United States Patent Office 3,211,727
Patented Oct. 12, 1965

3,211,727
9,11,21-TRICHLORO-16α,17α-ISOPROPYLIDENE STEROIDS OF THE PREGNANE SERIES
Milton Heller and Seymour Bernstein, New City, N.Y., assignors to American Cyanamid Company, Stamford, Conn., a corporation of Maine
No Drawing. Filed Feb. 12, 1964, Ser. No. 344,177
4 Claims. (Cl. 260—239.55)

This invention relates to new steroid compounds. More particularly, it relates to trichloro-16α,17α-alkylidenedioxy steroids of the pregnane series.

The novel compounds of the present invention may be illustrated by the following formula:

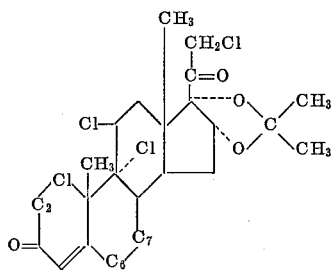

wherein

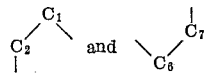

are divalent radicals of the group consisting of

—CH$_2$—CH$_2$— and —CH=CH—

The compounds of this invention are, in general, white crystalline solids, relatively insoluble in water, but generally soluble in organic solvents such as lower alkanols, acetone, ethyl acetate, and the like.

The present trichloro-steroids of the pregnane series described above may be prepared by a series of reactions starting with 11β,21-dihydroxy-16α,17α-isopropylidenedioxypregn-4-ene-3,20-dione, as outlined in the accompanying flowsheet hereinafter and as described in the examples which follow. The 9α,11β-dichloro-16α,17α-isopropylidenedioxypregnane steroids may be prepared from the corresponding Δ$^{9(11)}$-precursor.

The compounds of the present invention can be prepared, for example, starting with 11β,21-dihydroxy-16α, 17α-isopropylidenedioxypregn-4-ene-3,20-dione [J. Am. Chem. Soc., 81, 4573 (1959)]. The above compound can be converted into the corresponding 21-chloro derivative by treatment with methanesulfonyl chloride and subsequently with lithium chloride to produce 21-chloro-11β-hydroxy-16α,17α-isopropylidenedioxypregn-4 - ene - 3,20-dione (II). The latter compound on treatment with N-bromoacetamide produces the corresponding Δ$^{9(11)}$-derivative (III) which on reaction with lithium chloride in the presence of N-chloro-succinimide and a solvent containing hydrogen chloride produces 9α,11β,21-trichloro-16α, 17α-isopropylidenedioxypregn-4 - ene - 3,20 - dione (IV). When 21-chloro-11β-hydroxy - 16α,17α - isopropylidenedioxypregn-4-en-3,20-dione (II) is heated in a solvent with 2,3-dichloro-5,6-dicyano-1,4-benzoquinone the products are 21-chloro-11β-hydroxy-16α,17α - isopropylidenedioxypregna-1,4-diene-3,20-dione (V) and 21-chloro-11β-hydroxy-16α,17α-isopropylidenedioxypregna-1,4,6-triene - 3, 20-dione (VI). The steroid 21-chloro-11β-hydroxy-16α, 17α-isopropylidenedioxypregna-1,4-diene-3,20-dione (V) treated with N-bromoacetamide in a solvent produces 21-chloro-16α,17α - isopropylidenedioxypregna - 1,4,9(11)-triene-3,20-dione (VII) which on treatment with lithium chloride, N-chloro-succinimide and hydrogen chloride in a solvent produces 9α,11β,21-trichloro-16α,17α-isopropylidenedioxypregna-1,4-diene-3,20-dione (VIII). When 21-chloro-11β-hydroxy-16β,17β - isopropylidenedioxypregna-1,4,6-triene-3,20-dione (VI) is treated with N-bromoacetamide in pyridine there is obtained 21-chloro-16α,17α-isopropylidenedioxypregna-1,4,6,9(11)-tetraene-3,20 - dione (IX) which on treatment with lithium chloride, N-chloro succinimide, and hydrogen chloride in a solvent produces 9α,11β,21-trichloro-16α,17α-isopropylidenedioxypregna-1, 4,6-triene-3,20-dione (X).

The following flowsheet graphically illustrates the reactions described above.

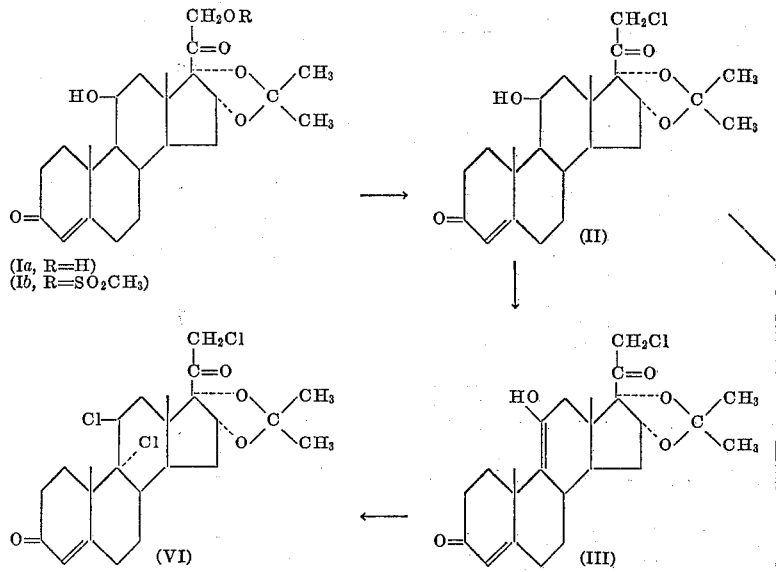

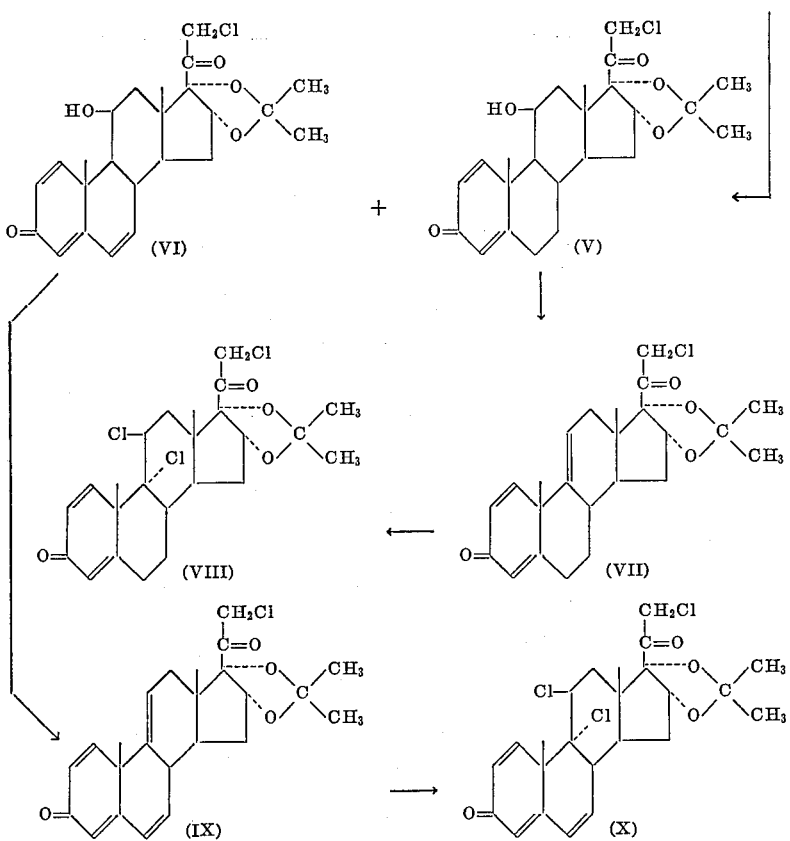

The compounds of this invention are useful as topical anti-inflammatory agents, not having by absorption systemic activity on adrenals or thymus. Thus, these compounds may prove useful in treating allergies and dermatological disorders. The compounds of this invention may also be useful in intra-articular therapy.

The following examples describe in greater particularity the preparation of the trichloro steroids of the present invention.

EXAMPLE 1

*Preparation of 11β-hydroxy-16α,17α-isopropylidenedioxy-21-methanesulfonyloxypregn-4-ene-3,20-dione (Ib)*

To a solution of 11β,21-dihydroxy-16α,17α-isopropylidenedioxypregn-4-ene-3,20-dione (6.5 g.) [J. Am. Chem. Soc., 81, 4573 (1959)] in pyridine (30 ml.) at 0° C. is added methanesulfonyl chloride (5 ml.) and the solution is allowed to stand 18 hours at 5° C. Addition of water gives a precipitate which is collected and is recrystallized from acetone-water to give the product, melting point 195°–198° C.

EXAMPLE 2

*Preparation of 21-chloro-11β-hydroxy-16α,17α-isopropylidenedioxypregn-4-ene-3,20-dione (II)*

A solution of 11β-hydroxy-16α,17α-isopropylidenedioxy-21-methanesulfonyloxypregn-4-ene-3,20-dione (1.0 g.) and lithium chloride (280 mg.) is refluxed ½ hour and then most of the solvent is removed under reduced pressure. Addition of water gives a precipitate which is collected and is recrystallized from acetone-petroleum ether (60°–70° C.) to give the product, melting point 257.5°–259° C. (dec.).

EXAMPLE 3

*Preparation of 21-chloro-11β-hydroxy-16α,17α-isopropylidenedioxypregna-1,4-diene-3,20-dione (V) and 21-chloro - 11β - hydroxy - 16α,17α - isopropylidenedioxypregna-1,4,6-triene-3,20-dione (VI)*

A mixture of 21-chloro-11β-hydroxy-16α,17α-isopropylidenedioxypregn-4-ene-3,20-dione (II, 2.16 g.) and 2,3-dichloro-5,6-dicyano-1,4-benzoquinone (1.6 g.) in dioxane (20 ml.) is refluxed 20 hours. After the mixture is cooled, it is filtered from precipitated hydroquinone and the solvent is removed under reduced pressure. The glass is dissolved in methylene chloride and filtered through a pad of megnesol to remove most of the color. The solvent is removed under reduced pressure and the resultant glass is crystallized from acetone-hexane to give 21-chloro-11β - hydroxy - 16α,17α - isopropylidenedioxypregna - 1,4-diene-3,20-dione (V). The melting point of the analytical sample is 297°–298° C.

From the mother liquors of the above crystallization 21 - chloro - 11β - hydroxy - 16α,17α - isopropylidenedioxypregna-1,4,6-triene-3,20-dione (VI) is isolated by direct crystallization, melting point 265°–267° C.

EXAMPLE 4

*Preparation of 21-chloro-16α,17α-isopropylidenedioxypregna-1,4,9(11)-triene-3,20-dione (VII)*

To a solution of 21-chloro-11β-hydroxy-16α,17α-isopropylidenedioxypregna-1,4-diene-3,20-dione (V, 0.93 g.) in pyridine (20 ml.) is added N-bromoacetamide (0.475 g.) and the resultant solution is allowed to stand in the dark 20 minutes. Sulfur dioxide is then bubbled through the solution while it is cooled in an ice-bath until the solution gives a negative starch-iodide test. Water is then added dropwise with stirring until a precipitate results. The precipitate is collected and crystallized from acetone-hexane to give the product VII, melting point 259.5°–260.5° C.

EXAMPLE 5

*Preparation of 9α,11β,21-trichloro-16α,17α-isopropylidenedioxypregna-1,4-diene-3,20-dione (VIII)*

A mixture of 21-chloro-16α,17α-isopropylidenedioxypregna-1,4,9(11)-triene-3,20-dione (VII, 0.5 g.) lithium chloride (2 g.) and N-chlorosuccinimide (0.173 g.) in acetic acid (20 ml.) is treated with a solution of tetrahydrofuran (0.5 ml.) saturated with hydrogen chloride. The mixture is stirred in the dark for 2 hours whereupon complete solution occurred. Upon pouring the solution into ice-water, a precipitate occurs which is collected. Crystallization from acetone-hexane gives the product VIII, melting point 228.5°–229° C.

EXAMPLE 6

*Preparation of 21-chloro-16α,17α-isopropylidenedioxypregna-1,4,6,9(11)-tetraene-3,20-dione (IX)*

A solution of 21-chloro-11β-hydroxy-16α,17α-isopropylidenedioxypregna-1,4,6-triene-3,20-dione (VI, 1.1 g.) in pyridine (25 ml.) is treated with N-bromoacetamide (0.63 g.) and worked up as in Example 4. The resultant product IX is crystallized from acetone-hexane, melting point 227.5°–228.5° C.

EXAMPLE 7

*Preparation of 9α,11β,21-trichloro-16α,17α-isopropylidenedioxypregna-1,4,6-triene-3,20-dione (X)*

A mixture of 21-chloro-16α,17α-isopropylidenedioxypregna-1,4,6,9(11)-tetrane-3,20-dione (IX, 0.5 g.), lithium chloride (2 g.) and N-chlorosuccinimide (0.173 g.) in acetic acid (20 ml.) and tetrahydrofuran (0.5 ml.) saturated with hydrogen chloride is stirred 40 minutes in the dark and worked up as in Example 5. The product X is crystallized from methanol-water, melting point 223°–223.5° C.

EXAMPLE 8

*Preparation of 21-chloro-16α,17α-isopropylidenedioxypregna-4,9(11)-diene-3,20-dione (III)*

A solution of 21-chloro-11β-hydroxy-16α,17α-isopropylidenedioxypregn-4-ene-3,20-dione (II, 1.87 g.) in pyridine (20 ml.) is treated with N-bromoacetamide (0.88 g.) and worked up as in Example 6. The product III is crystallized from acetone, melting point 279°–282° C.

EXAMPLE 9

*Preparation of 9α,11β,21-trichloro-16α,17α-isopropylidenedioxypregn-4-ene-3,20-dione (IV)*

A mixture of 21-chloro-16α,17α-isopropylidenedioxypregna-4,9(11)-diene-3,20-dione (III, 1.0 g.), lithium chloride (4 g.) and N-chlorosuccinimide (0.35 g.) in acetic acid (150 ml.) and tetrahydrofuran (1.0 ml.) saturated with hydrogen chloride is stirred in the dark 30 minutes and worked up as in Example 7. The product IV is crystallized from methylene chloride-ether, melting point 233°–233.5° C.

We claim:
1. A steroid of the formula:

[structural formula of steroid]

wherein

[partial structural formulas showing $C_1$–$C_2$ and $C_6$–$C_7$ fragments]

are divalent radicals selected from the group consisting of —$CH_2$—$CH_2$— and —CH=CH— and when

[fragment showing $C_6$–$C_7$]

is —CH=CH— then

[fragment showing $C_1$–$C_2$]

is —CH=CH—.

2. The compound 9α,11β,21-trichloro-16α,17α-isopropylidenedioxypregn-4-ene-3,20-dione.
3. The compound 9α,11β,21-trichloro-16α,17α-isopropylidenedioxypregna-1,4-diene-3,20-dione.
4. The compound 9α,11β,21-trichloro-16α,17α-isopropylidenedioxypregna-1,4,6-triene-3,20-dione.

No references cited.

LEWIS GOTTS, *Primary Examiner.*

UNITED STATES PATENT OFFICE
CERTIFICATE OF CORRECTION

Patent No. 3,211,727            October 12, 1965

Milton Heller et al.

It is hereby certified that error appears in the above numbered patent requiring correction and that the said Letters Patent should read as corrected below.

Column 1, lines 15 to 25, for the left-hand portion of the formula reading

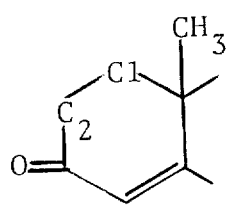      read      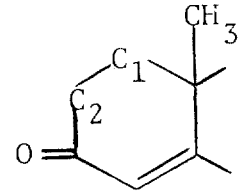

columns 1 and 2, the formula numbered "(VI)" should be renumbered as formula -- (IV) --; column 2, formula (III), strike out "HO"; column 6, lines 20 to 23, the left-hand formula should appear as shown below instead of as in the patent:

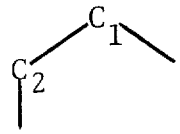

Signed and sealed this 24th day of May 1966.

(SEAL)
Attest:

ERNEST W. SWIDER            EDWARD J. BRENNER
Attesting Officer            Commissioner of Patents